July 11, 1950 R. F. GARBARINI ET AL 2,514,385
MAGNETIC CLUTCH
Filed Dec. 30, 1946

INVENTORS
ROBERT F. GARBARINI
ROBERT S. EDWARDS
BY
Herbert H. Thompson
ATTORNEY

Patented July 11, 1950

2,514,385

UNITED STATES PATENT OFFICE 2,514,385

MAGNETIC CLUTCH

Robert F. Garbarini, Woodside, and Robert S. Edwards, Hempstead, N. Y., assignors to The Sperry Corporation, a corporation of Delaware Application December 30, 1946, Serial No. 719,276

3 Claims. (Cl. 192—84)

This invention relates to a clutch, and more particularly to an electromagnetically operated clutch provided with two shafts, either of which may be coupled at will to a third shaft.

A feature of the invention is the provision of a clutch of small size and simple construction, particularly suitable for use in computers, such as fire control or bomb sight computers, and other devices wherein a small quick acting clutch is required.

Another feature of the invention is the provision of a clutch having an electromagnetically operable mechanism in which an electromagnet is mounted in stationary position permitting external control circuits to be connected directly thereto without the use of brushes or other moving contacts.

Another feature of the invention is the provision of an electromagnetic clutch of simple construction wherein the electromagnet is a solenoid coaxially fixed in the clutch casing. The solenoid controls magnetically a pair of cooperating annular approximately cup-shaped members of magnetic material positioned substantially within the solenoid, one of the members being fixed in translation, and the other being movable in translation in one direction under control of the solenoid, and by a spring in the opposite direction, the parts being so designed and arranged that a highly efficient magnetic circuit is provided.

Still another feature of the invention is the provision of a clutch for two speed operation in which all of the shafts may be of small diameter to permit the mounting of comparatively small gears thereon.

Other features of the invention will be found in the following description given with the aid of the accompanying drawings of which:

Figs. 1 and 2 are drawn to double scale for the sake of clarity.

Figure 1:
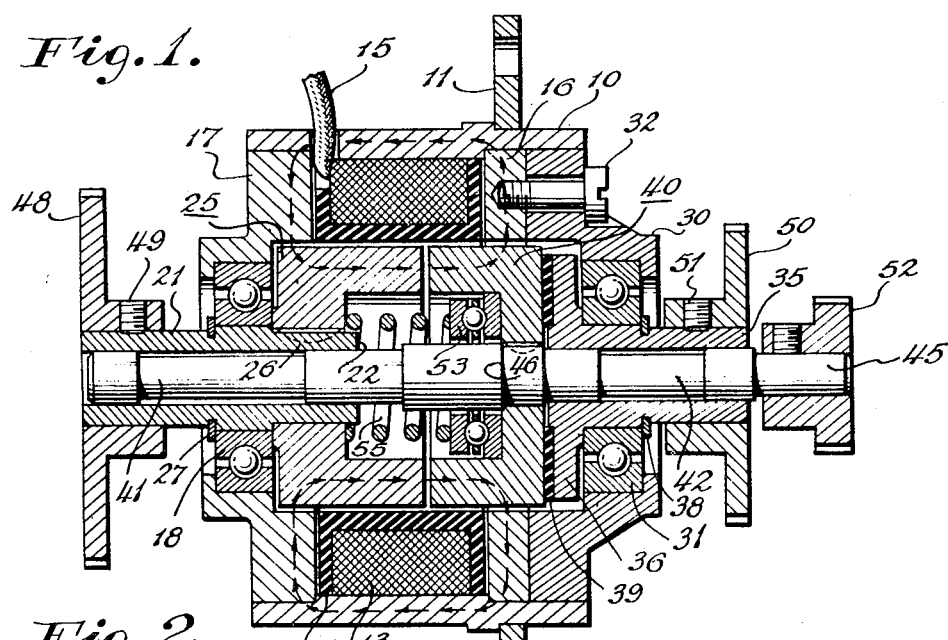
Fig. 1 is a view of a preferred form of the invention in vertical section showing the parts as they are positioned when the clutch magnet is deenergized.
Figure 2:
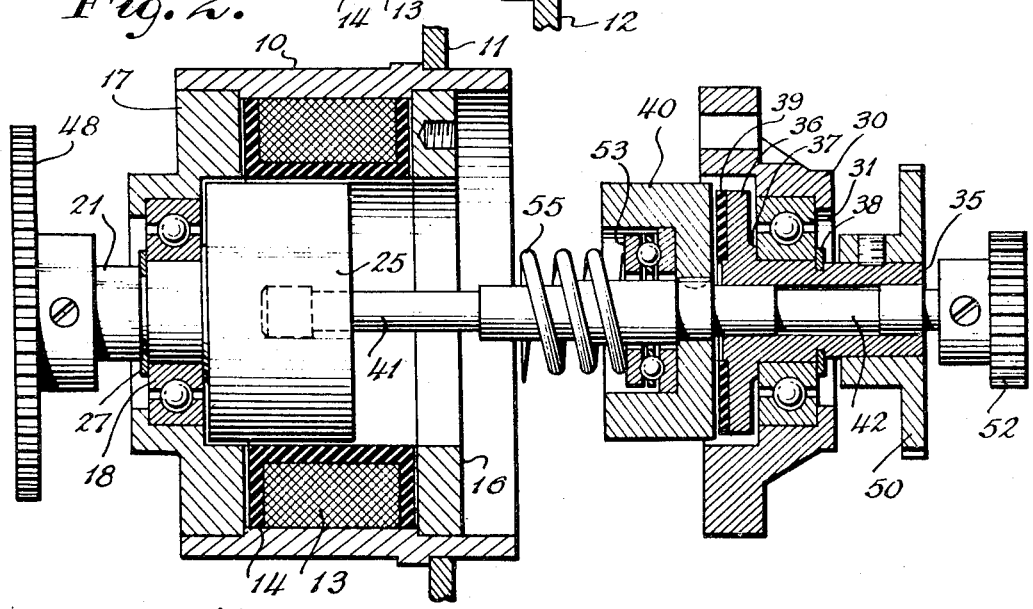
Fig. 2 is a partially exploded view of the clutch of Fig. 1. Both

Referring to Figs. 1 and 2 of the drawings, the clutch comprises a cylindrical casing 10 of magnetic material having mounting lugs 11 and 12 secured to the external surface thereof by any suitable means.

A solenoid coil 13 wound on an annular spool 14 of insulating material is disposed within the casing, substantially at the central part thereof A cable 15 extending out through an opening in casing 10 is used to connect the solenoid winding to external circuits.

A comparatively thick ring 16 of magnetic material, press-fitted into the casing, abuts one end of the solenoid spool 14 and forms part of the magnetic circuit therefor.

An end piece 17, of magnetic material, formed with a central opening in which is secured a ball bearing unit 18, is press-fitted or otherwise fastened in the casing 10, abutting the opposite end of spool 14, serving as a part of the magnetic circuit for the solenoid and also as a closure for one end of casing 10.

A hollow shaft 21 of bearing bronze or other suitable non-magnetic material is supported for rotation by bearing 18. One end portion 22 of shaft 21 projects beyond bearing 18 into casing 10, and on this end portion and extending well within the solenoid winding, a cup-shaped member 25 is press-fitted, keyed or otherwise suitably secured. The dotted arc 26 indicates a key connecting cup 25 with the part 22 of shaft 21. A snap washer 27 disposed in a groove formed in shaft 21 alongside bearing 18 acts as a stop to prevent axial movement of shaft 21. It will be understood that while hollow shaft 21 and the parts connected thereto are free to rotate in bearing 18, substantially no axial movement thereof is possible.

The opposite end of the casing is provided with an end piece 30 of non-magnetic material formed with a central opening in which is secured a ball bearing assembly 31. End piece 30 is held in position by screws 32, one of which is shown in Fig. 1 which passes through a suitable opening in the end piece and is threaded into an opening in ring 16.

A hollow shaft 35 of non-magnetic material, such as bearing bronze, having a flange 36 formed at one end is supported for rotation in the bearing assembly 31. Shaft 35 is restrained from axial movement in its bearing in one direction by a shoulder 37 formed on flange 36 which engages one side of the inner portion of bearing 31, and in the opposite direction by a snap washer 38 carried by shaft 35 which engages the inner part of the opposite side of bearing 31.

A ring of friction material is secured to one face of flange 36. This friction material cooperates with an axial movable cup member 40 of magnetic material generally similar to cup 25. The support for cup 40 will now be described.

A shaft 45 of suitable non-magnetic material, such as stainless steel, has opposite end portions supported for rotation and limited axial movement within the respective bores of the hollow shafts 35 and 21. Portions 41 and 42 of shaft 45 are reduced in diameter to decrease friction within the respective hollow shafts.

Cup 40 is keyed or otherwise fixed to shaft 45 immediately alongside a shoulder of an enlarged portion 46 formed near the mid-section of shaft 45, the open edges of cups 40 and 25 being in register with each other. Shaft 45 is axially movable a short distance, say .005 to .010 of an inch, its movement toward the left of the drawing being limited by the engaging of the respective edges of cups 25 and 40, while the movement of the shaft toward the right of the drawing is limited by the engagement of the right hand surface or base of cup 40 with the ring of friction material 39 on flange 36.

A gear 48 is fastened by a screw 49 to hollow shaft 21 while a gear 50 is secured by screw 51 to hollow shaft 35. A gear 52 is attached on an end portion of shaft 45 which projects beyond gear 50.

Shaft 45 extends through a thrust bearing 53 positioned against the base of cup 40 on the inside thereof. The shaft turns clear of this bearing. One end of a compression spring 55, disposed about shaft 45 and within the cups, presses against the thrust bearing 53 while the opposite end of the spring engages the base of cup 25. The spring tends to separate the cups and is effective when the clutch magnet is deenergized, as shown in Fig. 1, to hold the base of cup 40 pressed against friction ring 39 thereby directly coupling gear 50 with gear 52. Under these conditions gear 48 is disconnected from gear 52, for when the former is turned, cup 25 fixed thereto freely rotates together with spring 55 which rests against thrust bearing 53 and therefore substantially no torque is communicated from the spring 55 to cup 40.

It will be remembered that solenoid winding 13 is enclosed by a symmetrical magnetic structure including casing 10, end piece 17 and ring 16. Enclosed substantially within this structure and closely fitting the central bore thereof are the two cup-shaped members 25 and 40 also of suitable magnetic material. This arrangement provides a highly efficient and symmetrical path for the lines of force or magnetic flux from the solenoid which is initially interrupted, but highly concentrated, across the space between the opposed edges of the cups. The open-end walls of the cup-shaped members provide a substantially narrow path for the flow of magnetic flux therethrough and it will be noted that the adjacent ends of the cup-shaped members are spaced a substantial distance radially from the axis of said members. The structure is thus effective with a relatively small number of ampere turns on energizing the solenoid, to attract and translate cup 40 together with shaft 45 and gear 52, and magnetically lock the open edges of the respective cups together and thereby couple gear 48 to gear 52. The relatively large radial displacement of the cooperating walls of the cups 25 and 40 from their axis of rotation further provides a high torque transfer therebetween upon energization of coil 13. This translation of cup 40 due to the energizing of the solenoid disengages cup 40 from friction ring 39 and thus disconnects gear 50 from gear 52.

When the energizing circuit (not shown) for solenoid 13 is disconnected, the parts just mentioned become demagnetized and spring 55 translates cup 40 to the right and holds the same in engagement with friction ring 39 thus coupling again gear 50 with gear 52, as shown in Fig. 1.

Figure 3:
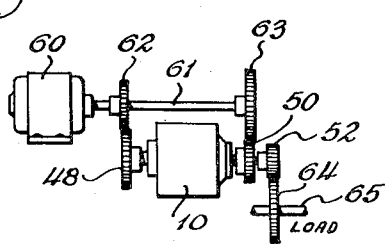
Fig. 3 shows the clutch of the present invention coupled with a driving motor to provide a two-speed output therefrom.

Fig. 3 shows schematically one use of the invention wherein an output shaft may be driven at either of two rates from a single motor 60. It will be understood, however, that the clutch may be used in various ways other than that about to be described.

In the arrangement about to be described, for the purpose of showing the operation of the invention, gears 48 and 50 will be considered to be input gears for the clutch and gear 52 an output gear. Gear 48 is shown as being larger than gear 50 and, therefore, the respective inputs for the clutch are to be driven at different rates. The clutch is used to connect the desired input to the output gear 52.

Motor 60 has a shaft 61 on which are mounted in spaced relation gears 62 and 63. In the particular arrangement, gear 62 is of smaller diameter than gear 63 and is in mesh with the larger input gear 48 on shaft 21 of the clutch. Gear 63 is in mesh with the smaller input gear 50 of the clutch. When motor 60 is in operation, all of the gears just mentioned are driven. Assuming that the device is used to actuate a tracking telescope of a fire control device (not shown), and that the rate of the motor is controllable by some suitable means (not shown), then when the clutch magnet is energized, gear 52 is driven at a lower rate suitable for tracking a target. Then if it be desired to slew the tracking device to overtake a new target rapidly, the clutch operating circuit may be deenergized by any suitable circuit breaking means (not shown), and gears 63 and 50 which have the higher ratio will be effective to drive output gear 52 at the more rapid slewing rate.

Gear 52 is shown as driving a gear 64 fastened to an output shaft 65. The slight axial movement of gear 52 on the operation of the clutch has no effect on the gear 64 driven thereby. In the drawings gear 52 is shown to be slightly thicker than the gear 64 with which it meshes, and this will ensure the gears being properly meshed irrespective of slight movements in translation of gear 52.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A clutch comprising a cylindrical casing of magnetic material, an annular winding fixed within the casing and an end piece of magnetic material disposed adjacent one side of the winding in one end of the casing having a central bearing opening formed therein, a ring of magnetic material disposed within the casing at the opposite side of the winding having a central opening substantially in register with that of the winding, a second end piece of non-magnetic material closing the opposite end of the casing having a central bearing opening therein, a first tubular shaft supported for rotation in the first-mentioned bearing opening, a cup-shaped member of magnetic material disposed partly within the winding and coaxially fixed to the first tubular shaft, a second tubular shaft supported for rotation in the second-mentioned bearing opening having a flanged portion formed thereon, a shaft supported for rotary and axial movement in the bore of said second tubular shaft and extending into the central portion of the first tubular member to be rotatably supported thereby, a cup-shaped magnetic armature fixed to the latter shaft and disposed partly within the winding, the open ends of said cup-shaped member and armature being closely spaced in substantial registry and said member and armature being rotatable in closely spaced relation to said winding whereby to form a highly efficient magnetic coupling, spring means located in the cavity formed between the armature and member biasing the armature away from the member in an axial direction against said flange portion, said winding being effective on energization to bring the armature and member into engagement to magnetically couple the same, and on deenergization thereof to drivably couple said armature and said second tubular shaft through said flange portion.

2. A clutch comprising a cylindrical casing of magnetic material, an annular winding fixed within the casing and an end piece of magnetic material disposed adjacent one side of the winding in one end of the casing having a central bearing opening formed therein, a ring of magnetic material disposed within the casing at the opposite side of the winding having a central opening substantially in register with that of the winding, a second end piece of non-magnetic material closing the opposite end of the casing and having a central bearing opening therein, a first tubular shaft supported for rotation in the first-mentioned bearing opening, a cup-shaped member of magnetic material disposed partly within the winding and coaxially fixed to the first tubular shaft, a second tubular shaft supported for rotation in the second-mentioned bearing opening and having a flange portion formed thereon, a friction ring secured to said flange portion, a shaft supported for rotary and axial movement in the bore of said second tubular shaft and extending into the central portion of the first tubular member to be rotatably supported thereby, a cup-shaped magnetic armature fixed to the latter shaft and disposed partly within the winding, the open ends of said cup-shaped member and armature being closely spaced in substantial registry and said member and armature being rotatable in closely spaced relation to said winding whereby to form a highly efficient magnetic coupling, spring means located in the cavity formed by the armature and member tending to displace the armature away from the member in an axial direction against the friction ring on said flange portion, said winding being effective on energization thereof to bring the armature and member into engagement and magnetically couple the same, and on the deenergization thereof to drivably couple said armature and said second tubular shaft through said friction ring and flange portion.

3. A clutch comprising a cylindrical casing of magnetic material, an annular winding fixed within the casing and an end piece of magnetic material disposed adjacent one side of the winding in one end of the casing having a central bearing opening formed therein, a ring of magnetic material disposed within the casing at the opposite side of the winding having a central opening substantially in register with that of the winding, a second end piece of non-magnetic material closing the opposite end of the casing having a central bearing opening therein, a first tubular shaft supported for rotation in the first-mentioned bearing opening, a cup-shaped member of magnetic material disposed partly within the winding coaxially fixed to the first tubular shaft, a second tubular shaft supported for rotation in the second-mentioned bearing opening having a flange portion formed thereon, a shaft supported for rotary and axial movement in the bore of said second tubular shaft and extending into the central portion of the first tubular member to be rotatably supported thereby, a cup-shaped magnetic armature fixed to the latter shaft and disposed partly within the winding, the open ends of said cup-shaped member and armature being rotatable in closely spaced relation to said winding and substantially radially spaced from the axis of rotation thereof whereby to provide a relatively high torque transfer therebetween on energization of said winding, spring means located in the cavity formed between the open walls of the armature and member tending to displace the armature away from the member in an axial direction and against said flange portion, said winding being effective on energization thereof to bring the armature and member into engagement and magnetically couple the same, and on deenergization thereof to drivably couple said armature and said second tubular shaft through said flange portion.

ROBERT F. GARBARINI.
ROBERT S. EDWARDS.

REFERENCES CITED

The following references are of record in the file of this patent:

UNITED STATES PATENTS

| Number | Name | Date |
|---|---|---|
| 511,621 | Johnston, et al. | Dec. 26, 1893 |
| 2,169,089 | Davenport | Aug. 8, 1939 |
| 2,180,412 | Hart | Nov. 21, 1939 |
| 2,401,003 | Lear | May 28, 1946 |
| 2,430,174 | Hoover | Nov. 4, 1947 |